United States Patent Office 2,813,900
Patented Nov. 19, 1957

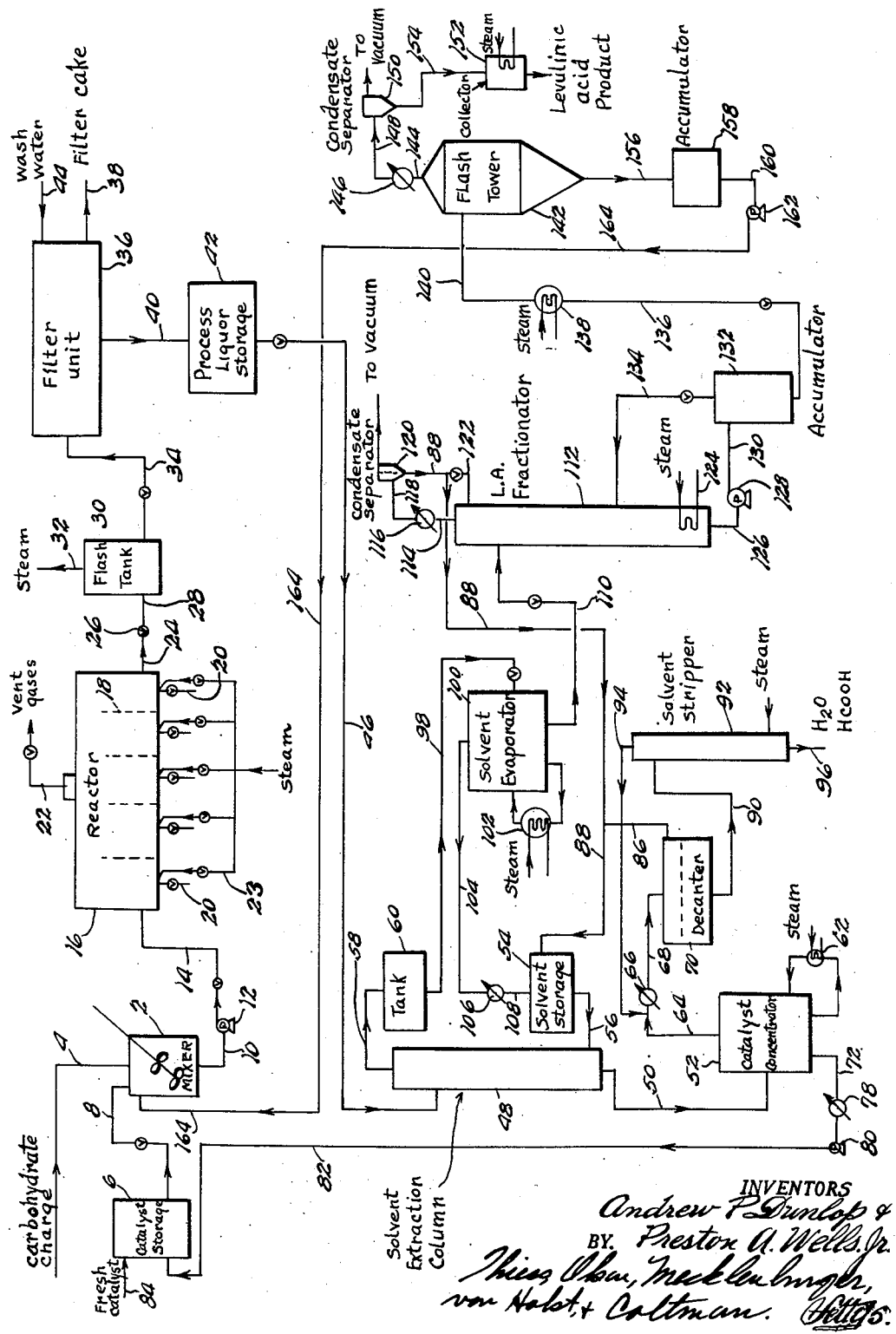

2,813,900
PROCESS FOR PRODUCING LEVULINIC ACID

Andrew P. Dunlop, Riverside, and Preston A. Wells, Jr., Winnetka, Ill., assignors to The Quaker Oats Company, Chicago, Ill., a corporation of New Jersey Application August 5, 1953, Serial No. 372,532

13 Claims. (Cl. 260—528)

This invention relates to a process of preparing levulinic acid and has for an object the provision of an economically feasible commercial process for producing this substance.

In the past, several processes have been proposed for the production of levulinic acid which involve the step of digesting a carbohydrate material, such as cellulose, starch or sugars, with an acid catalyst under sufficiently severe reaction conditions to produce levulinic acid. Furthermore, there are several suggestions in the prior art with respect to procedures for separating levulinic acid from mixtures containing the same. However, up until the present time there are no disclosures in the prior art with respect to a commercially feasible process for producing levulinic acid by a continuous method. Accordingly, it is a further object of this invention to provide a continuous process for the production of a substantially pure levulinic acid product.

A further object of this invention is the provision of a continuous process for producing levulinic acid in which the catalyst employed is separated from the reaction products and recycled to the reaction zone.

A further object of this invention is the provision of an efficient unitary process for producing levulinic acid in high yields substantially free of tars, water-soluble, nonvolatile by-products, formic acid or catalyst contaminant.

Further and additional objects will appear from the following description, the accompanying drawing and the appended claims.

In accordance with one embodiment of this invention, there has been provided a continuous process for the preparation of levulinic acid which comprises the steps of continuously passing a mixture or dispersion of hexose-yielding material and a water solution of a substantially nonvolatile catalyst through a reaction zone maintained at an elevated temperature whereby to produce a substantial amount of levulinic acid from the hexose-yielding material. Thereafter a solid residue is separated from the reactants resulting in an aqueous process liquor containing the catalyst and levulinic acid and certain products in solution. The process liquor is then contacted with a levulinic acid extractive solvent which is substantially immiscible with the process liquor whereby to form an extract liquid comprising essentially the solvent and levulinic acid and an aqueous raffinate containing the catalyst. The raffinate is concentrated and is recycled as the catalyst to the reaction zone and the levulinic acid is separated from the extracting solvent, the solvent being recycled to the contact zone and the levulinic acid fraction being subjected to further concentrating and purifying treatments.

The charge material providing the source for the levulinic acid in accordance with this invention may comprise any hexose-yielding substance, such as a sugar, dextrin, starch, cellulose, partially degraded cellulose, lignocellulosic materials and certain vegetable resins having a hexose component. Specific examples of vegetable material or hexose-yielding material that may be charged to the process of this invention are corncobs, bagasse, oat hulls, rice hulls, wood, cellulosic residues obtained from processes of producing furfural, starches, hydrol or sugar-containing residues of various types. The hexose-yielding charge material indicated above is mixed with water having dissolved therein a nonvolatile catalyst which is capable of catalyzing the levulinic acid-producing reaction when the hexose-yielding material is heated to elevated temperatures, preferably above 150° and suitably between 150° to 200° C. It is preferred to use a nonvolatile acid-reacting catalyst, such as sulfuric acid, phosphoric acid, or sodium acid sulfate. However, it will be apparent that other nonvolatile acid-reacting catalysts may be used which are known to be useful in a levulinic acid-producing process.

The solvents that may be used in the continuous process of this invention for extracting the levulinic acid from the process liquor formed by the digestion of the hexose-yielding material include any of the well known solvents that are capable of extracting levulinic acid from an aqueous solution thereof. Such solvents should be substantially immiscible with the process liquor to permit of an exchange of the levulinic acid from the aqueous phase to the solvent phase. Likewise the solvent should be stable toward the catalyst that is contained in the process liquor or under the conditions at which the contact is effected. For example, methyl isobutyl ketone is a solvent that is particularly adaptable for use in the process of this invention. The use of this particular solvent for the extraction of levulinic acid is broadly disclosed in the copending application of Edward Sherman, Serial No. 257,176, filed November 19, 1951, now Patent No. 2,684,981, which issued July 27, 1954. Furfural is also a particularly suitable solvent for use in accordance with the process of this invention. The use of furfural for the extraction of levulinic acid from aqueous solutions is broadly disclosed and claimed in the copending application of Andrew P. Dunlop, Serial No. 257,177, filed November 19, 1951, now Patent No. 2,684,982, which issued July 27, 1954. It will be apparent that other solvents, such as methylene chloride, other halogenated hydrocarbons, and, in fact, any suitable solvent which is stable under the conditions of use, may be employed.

In accordance with the preferred embodiment of this invention, the hexose-yielding material such as cellulose is dispersed in water having dissolved therein a nonvolatile acid-reacting catalyst. It is preferred that the resulting dispersion be sufficiently liquid so that it may be readily pumped and flowed through suitable conduits in a continuous manner. The ratio of water to solid material (dry basis) in the dispersion is preferably between 0.5 to 1 and 5.0 to 1. The dispersion is then continuously passed through an enlarged reactor at a flow rate such that the average residence time of the material within the reactor is between about 15 minutes and about 8 hours. The reactor is preferably maintained under superatmospheric pressure in order to permit the reaction to occur in the liquid phase and the temperature of the material during passage through the reactor is preferably between about 150° and 200° C. It will be appreciated that the rate of formation of levulinic acid within the reactor is dependent upon the temperature, the catalyst employed and the catalyst concentration. It will also be understood that the temperature may be increased above 200° C. if desired and under such conditions the time of reaction will be correspondingly reduced. If the catalyst is sulfuric acid and if the concentration of the catalyst is in the neighborhood of 10 percent (based upon the water in the dispersion) and if the temperature in the reactor is maintained around 200° C., substantial conversion can be effected in a matter of about 15 minutes. On the other hand, with low catalyst concentration and at the lower range of temperature, the substantial conversion may require as much as 8 hours. Generally speaking, the preferred ratio of water to solid in the reaction mass is between about 0.5 and 5.0 to 1; and when sulfuric acid is the catalyst used, the preferred catalyst concentration in the liquid employed to make up the dispersion is preferably between about 2 and 16 percent, the preferred temperature range in the reactor or digester is between about 150° and 200° C., and the time at reaction conditions is between about 15 minutes and 8 hours.

The reactor may suitably take the form of an elongated horizontally disposed chamber which may be equipped with mechanical or steam agitating means and baffles or other elements to prevent channeling through the reactor. The liquid effluent from the reactor is preferably passed to a flash tank from which a portion of the water is flashed from the reactor mixture, and the liquid effluent from the flash chamber is then passed to a filter unit or other device for separating solid residue comprising insoluble tars and humins from the process liquor. The process liquor containing essentially water, levulinic acid, catalyst, formic acid and some unidentified soluble, nonvolatile material is then contacted with the levulinic acid extractive solvent in a suitable contact tower whereby the solvent removes the levulinic acid from the aqueous solution to the substantial exclusion of the nonvolatile catalyst which latter remains in the aqueous raffinate. The nonvolatile catalyst in the raffinate is concentrated by any suitable means such as evaporation of the water and the acid so concentrated is recycled with fresh increments of hexose-yielding material to the reactor. The solvent is separated from the levulinic acid in the extract phase and is recycled to the contact column. The levulinic acid is then fractionated to remove last traces of solvent, formic acid and other products which may have passed through the process to this stage of the operation. A portion of the residue which may also contain substantial amounts of levulinic acid is preferably recycled to the process, suitably to the initial reaction zone.

For a more complete understanding of this invention, reference will now be made to the accompanying drawing which is a schematic showing of one embodiment of the process of this invention.

A carbohydrate such as a cellulose-containing residue from a furfural-producing process is charged to a mixer 2 through line 4, and an acid catalyst dissolved in water is also charged to the mixer from a catalyst storage tank 6 through valved line 8. The residue may suitably be a residue by-product from a furfural process such as is disclosed in Brownlee United States Patent No. 2,140,572. From the mixer 2 the resulting dispersion of furfural residue and dilute acid catalyst is passed through line 10, pump 12 and line 14 to an enlarged reactor 16. The ratio of water to solids charged to the reactor 16 is suitably between about 0.5 to 1 and 5.0 to 1. This reactor is provided with a plurality of upwardly extending transverse baffle plates 18 which serve to prevent rapid straight line flow of material therethrough and is provided with a plurality of valved drain lines 20 and (if desired) a pressure controlled line 22 for bleeding noncondensable gases formed in the process from an upper portion thereof. Steam is introduced into the reactor at a plurality of points through lines 23 in order to provide adequate agitation within the reactor and in order to supply the necessary heat thereto. Other means may be employed for heating the reactor and for agitating the contents thereof. The steaming is controlled to heat the contents of the reactor to the desired temperature, the pressure within the reactor being substantially in excess of atmospheric. The size of the reactor is such that the reactants remain within the reactor under reaction conditions for an average time of between about 15 minutes and about 8 hours, suitably 3 hours. The reacted materials are continuously discharged from the reactor through line 24, a pressure reduction valve 26 and line 28 to a flash tank 30. A substantial portion of water is removed from the reactor effluent in the form of steam through line 32. The flashed liquid is then flowed by means of valved line 34 to a suitable filter unit 36 which serves to remove solid residue from the reaction mass, the filter cake being discharged through line 38.

The process liquor is withdrawn from filter unit 36 through line 40 to a process liquor storage tank 42. Wash water may be passed to the filter unit through line 44 for the purpose of washing the filter cake, and the washings are combined with the filtrate in the tank 42. Thereafter the aqueous process liquor in the tank 42, which may contain about 5% levulinic acid, 5% acid catalyst, 3% water-soluble nonvolatile by-products, and 2% to 3% formic acid, is passed through valved line 46 to an upper portion of a solvent extraction column 48. This column may take the form of a column packed with Raschig rings or any other suitable contact devices or plates. The process liquor, being aqueous in nature, descends downwardly through the contact tower 48 and the aqueous raffinate is discharged from the bottom thereof through line 50 to a catalyst concentrator 52. At the same time a solvent, which in this instance comprises methyl isobutyl ketone, is passed from a storage tank 54 through line 56 into the bottom of the solvent extraction column 48. This solvent, being lighter than and substantially immiscible in the process liquor, flows upwardly through the tower 48 in direct contact and in countercurrent flow relationship with the process liquor. In the tower the levulinic acid, being soluble in methyl isobutyl ketone, dissolves therein and passes with the solvent out of the top of the column 48 through line 58 to a tank 60. The solvent extracts substantially all of the levulinic acid from the process liquor together with some nonvolatile products, formic acid and about 2% water.

The raffinate or aqueous phase discharged from the column 48 through the line 50 comprises essentially water and catalyst together with some formic acid, nonvolatile products, and a small amount (about 2%) of methyl isobutyl ketone which is dissolved in the liquor during passage through the column 48.

Essentially the catalyst concentrator 52 consists of an evaporator which is heated to a desired temperature by circulating the bottoms through a steam-heated heat exchanger 62. A vaporous product comprising principally water and some methyl isobutyl ketone and formic acid is distilled overhead through line 64, the distillate is condensed in condenser 66, and the condensate is passed by line 68 to a decanter 70. The bottoms from the concentrator 52 having an increased acid catalyst content are passed through line 72, the cooler 78, pump 80 and line 82 for recycle to the catalyst storage tank 6. Make-up catalyst may be added to the system as becomes necessary through line 84.

In the decanter 70 the solvent and water separate into two phases. The solvent phase is decanted off and passed by lines 86 and 88 to the solvent storage tank 54 for recycle to the extraction column 48. The aqueous phase is discharged from the decanter 70 through line 90 to a solvent stripper 92 which takes off the last traces of solvent together with some water and the overhead is recycled through line 94 to line 64 for condensation in the condenser 66 and repassage to the decanter 70 as will be understood. A product containing essentially water and formic acid is discharged from the bottom of the solvent stripper through line 96.

As previously indicated, the extract from the column 48 contained within tank 60 contains essentially the solvent and the extracted levulinic acid together with small amounts of water, formic acid and nonvolatile products. This solvent phase is passed through valved line 98 to a solvent evaporator 100 which may be heated by circulating the bottoms through a steam-heated heat exchanger 102. Solvent vapors which contain a small amount of water and formic acid are passed overhead from the evaporator 100 through line 104 and condenser 106 for discharge of the solvent to the tank 54 through line 108. The bottoms from the evaporator 100 consisting essentially of levulinic acid contaminated with some solvent, nonvolatile products, formic acid and water are passed through valved line 110 to a vacuum tower 112 which serves to separate the last traces of solvent, water and formic acid from the levulinic acid. The overhead product containing these materials is passed through line 114, condenser 116, line 118, condensate separator 120, and line 88 for recycle to the solvent storage tank 54. A valved line 122 may communicate line 88 and the top of the fractionator 112 to control temperature conditions therein, as is well known. The fractionator 112 is heated at the bottom by means of a steam coil 124 or other equivalent means. Substantially pure levulinic acid now contaminated only with a nonvolatile material is discharged from the bottom of the fractionator 112 through line 126, pump 128 and line 130 to a suitable accumulator 132. If desired, a portion of the product from within the accumulator may be recycled to the fractionator 112 through valved line 134 in order further to control the conditions within the fractionator. The pressure within the fractionator 112 may suitably be between 20 to 25 millimeters of mercury. In order to separate the nonvolatile products from the levulinic acid, the product within the accumulator is passed by valved line 136 through the steam-heated heat exchanger 138 and line 140 to a vacuum flash tower 142. Substantially pure levulinic acid passes overhead from the flash tower through line 144, condenser 146, line 148 and separator 150 for discharge into a steam-heated collector 152 by means of line 154. The bottoms from the flash tower containing all of the nonvolatile material and a relatively high concentration of levulinic acid are passed through line 156, accumulator 158, line 160, pump 162 and line 164 for recycle to the mixer 2 from whence it passes to the reactor 16. It is preferred that the bottoms from the flash tower 142 be recycled to the reactor since this product may contain hexose-yielding materials that can be further broken down by repassage through the reactor to produce additional quantities of levulinic acid. However, in order to recover the levulinic acid contained in the bottoms from flash tower 142 without regard to the nonvolatile material contained in this fraction, it may be desirable to cycle this material elsewhere in the system, such as, for example, to the process liquor storage tank 42.

It will be apparent from the foregoing description that a complete and simple method has been provided for the continuous production of levulinic acid by means of a procedure which permits of the complete separation and reuse of the catalyst employed and for recovering and reusing all of the solvent that may be used for the extraction of levulinic acid from the reaction products. This desired result has been achieved by the selection of a conversion process in which a nonvolatile solvent is employed and by the selection of a solvent which will effectively extract the levulinic acid from the reaction mixture under the conditions set forth. By this process it is possible to obtain between 10 and 20 percent of levulinic acid based on the weight of dry charge of hexose-yielding material to the system where that hexose-yielding material comprises largely cellulose such as a residue from a process of making furfural from oat hulls or corncobs. Higher yields may be expected where the charge material comprises starch or sugars which may be more readily converted to levulinic acid than cellulosic residues, as is well known.

As previously indicated, a number of acid-reacting nonvolatile catalysts may be employed in carrying out the process of this invention. Suitable catalysts are sulfuric acid, phosphoric acid and sodium acid sulfate. The concentrations of catalysts, the time and temperatures of conversion, the choice of solvents for use in the extraction step, etc. will be governed in part by the particular acid catalyst used. In order to further illustrate the present invention, several examples are here presented showing the conversion of hexose-yielding materials to levulinic acid.

*Example I*

A corncob furfural residue and water mixture in a water to residue (dry basis) ratio of about 3.6 to 1 was charged to a reactor and sulfuric acid was added in an amount equal to about 4.5% of the total water present. The charge was heated in the reactor under superatmospheric pressure to a temperature of about 336° F. (169° C.) and this temperature was maintained for an average time of about two hours. Under these conditions the yield of levulinic acid was 19.9% based upon the weight of the dry furfural residue charged to the process.

*Example II*

This example is similar to Example I except that the water to dry residue ratio was about 0.65 to 1 and the sulfuric acid catalyst concentration was 11.4% of the water present. After heating under superatmospheric pressure at about 336° F. for 3 hours, the levulinic acid yield was 14.0%.

*Example III*

In this example 2900 parts by weight of a corncob furfural residue (moisture content 4.8%) was charged to a reactor with 5200 parts by weight of water and 4300 parts by weight of sodium acid sulfate. This mixture was digested at a temperature corresponding to 100 p. s. i. g. for a period of 3 hours to form levulinic acid, the yield being 14.4% based on the dry weight of the residue charged.

*Example IV*

In this example 10,000 parts by weight of a corncob furfural residue (moisture content 9.4%) was charged to a reactor with 17,000 parts by weight of water and 5400 parts by weight of phosphoric acid (85% $H_3PO_4$). This mixture was digested at a temperature corresponding to 100 p. s. i. g. for a period of 6 hours to form 15.7% levulinic acid yield based upon the dry weight of the residue charged.

It will be noted from the foregoing examples that sulfuric acid may be preferred over the weaker acids because less catalyst is thereby required. However, the other catalysts may be preferred under certain operating conditions. For example, an acid-reacting salt such as sodium sulfate may be preferred where it is desirable to improve the filterability of the reaction mass prior to the reaction step. Also, as previously mentioned, the less acidic catalysts may be utilized where it is desired to broaden the range of solvents that may be used in the subsequent purification step. It is important, however, that the catalyst be nonvolatile so that it may be recovered and recycled in accordance with the process of this invention.

While particular embodiments of this invention are suggested above, it will be understood, of course, that the invention is not to be limited thereto, since many modifications may be made, and it is contemplated, therefore, by the appended claims, to cover any such modifications as fall within the true spirit and scope of this invention.

We claim:

1. A continuous process for the preparation of levulinic acid which comprises continuously passing a mixture of a hexose-yielding material and a water solution of a substantially nonvolatile catalyst through a reaction zone maintained at an elevated temperature and under superatmospheric pressure whereby said mixture rapidly attains the elevated temperature of said reaction zone and a substantial amount of levulinic acid is formed, separating a solid residue from the reactants to produce an aqueous process liquor containing said catalyst and levulinic acid in solution, contacting said process liquor in a contact zone with a levulinic acid extractive solvent substantially immiscible with said aqueous process liquor to form an extract liquid comprising essentially said solvent and levulinic acid and an aqueous catalyst-containing raffinate, concentrating the catalyst in said raffinate for recycle to said reaction zone, separating levulinic acid from said extract liquid, and cycling the resultant solvent to said contact zone.

2. A continuous process for the preparation of levulinic acid which comprises continuously passing a mixture of a hexose-yielding material and a water solution of a substantially nonvolatile acid-reacting catalyst through a reaction zone maintained at an elevated temperature and under superatmospheric pressure whereby said mixture rapidly attains the temperature of said reaction zone and a substantial amount of levulinic acid is formed, separating a solid residue from the reactants to produce an aqueous process liquor containing said catalyst and levulinic acid in solution, passing said process liquor through a contact zone in countercurrent flow relationship with a levulinic acid extractive solvent substantially immiscible with said process liquor, withdrawing a solvent phase enriched with levulinic acid from said contact zone, separating levulinic acid from said solvent phase, cycling the resulting solvent to said contact zone, separately withdrawing an aqueous raffinate containing said catalyst from said contact zone, concentrating the catalyst in said raffinate, and cycling said catalyst to said reaction zone.

3. A continuous process for the preparation of levulinic acid which comprises dispersing one part by weight of a cellulosic material in between about 0.5 and 5.0 parts by weight of water having dissolved therein a substantially nonvolatile acid-reacting catalyst, flowing the resulting dispersion through an enlarged reaction chamber at about 150° to 200° C. under sufficient pressure to maintain the liquid phase with the average residence time in said chamber being between about 15 minutes and 8 hours whereby said dispersion rapidly attains the temperature of said reaction chamber and a substantial amount of levulinic acid is formed, thereafter separating a solid residue from the reactants to produce an aqueous process liquor containing said catalyst and levulinic acid in solution, continuously passing said process liquor through a contact zone, passing a levulinic acid extractive solvent substantially immiscible with said process liquor through said contact zone in countercurrent flow relationship with said process liquor, withdrawing a solvent phase enriched with levulinic acid from said contact zone, separating levulinic acid from said solvent phase, cycling the resulting solvent to said contact zone, separately withdrawing an aqueous raffinate containing said catalyst from said contact zone, concentrating the catalyst in said withdrawn raffinate, and cycling said catalyst to said reaction chamber.

4. The process recited in claim 3 wherein said catalyst is sulfuric acid.

5. The process recited in claim 3 wherein said catalyst is sulfuric acid and said solvent is methyl isobutyl ketone.

6. A continuous process for the preparation of levulinic acid which comprises dispersing one part by weight of a cellulosic material in between about 0.5 and 5.0 parts by weight of water having dissolved therein about 2 to 16 percent by weight of sulfuric acid, continuously flowing the resulting dispersion through a reaction zone maintained at an elevated temperature at a pressure sufficient to maintain the liquid phase for a time sufficient to produce substantial quantities of levulinic acid, said dispersion rapidly attaining the temperature of said reaction zone after having been introduced therein, separating a solid residue from the reaction products whereby to form an aqueous process liquor containing levulinic acid, nonvolatile soluble impurities and sulfuric acid, passing said process liquor into countercurrent flow contact relationship with a levulinic acid extractive solvent substantially immiscible with said process liquor in a contact zone whereby to form a solvent extract phase containing levulinic acid and a portion of said impurities and an aqueous raffinate phase containing sulfuric acid, concentrating said sulfuric acid in said aqueous phase by evaporation, cycling the thus concentrated acid to the reaction zone, evaporating solvent from said solvent phase whereby a concentrate residue containing essentially levulinic acid and said impurities is formed, cycling the evaporated solvent to said contact zone, distilling said concentrate residue under vacuum whereby a levulinic acid product is taken overhead, and cycling bottoms containing said impurities from the distillation step to said reaction zone.

7. A continuous process for the preparation of levulinic acid which comprises dispersing one part by weight of a cellulosic material in between about 0.5 and 5.0 parts by weight of water having dissolved therein about 2 to 16 percent by weight of sulfuric acid, continuously flowing the resulting dispersion through an enlarged reaction zone, maintaining said reaction zone at about 150° to 200° C. under superatmospheric pressure to maintain water therein in the liquid phase with the average residence time of the dispersion in the reaction zone being between about 15 minutes and 8 hours whereby a substantial quantity of levulinic acid is formed, said dispersion rapidly attaining the temperature of said reaction zone after introduction therein, passing the effluent from the reaction zone to a zone of reduced pressure whereby a portion of the water contained therein is removed by flashing, separating a solid residue from the liquid effluent from the last mentioned zone whereby to produce an aqueous process liquor containing said sulfuric acid, nonvolatile impurities and levulinic acid in solution, continuously passing said process liquor through a contact zone, passing a levulinic acid extractive solvent substantially immiscible with said process liquor and nonreactive toward said sulfuric acid through said contact zone in countercurrent flow, direct contact relationship with said process liquor, withdrawing from said contact zone a solvent extract enriched with levulinic acid and containing a portion of said impurities and formic acid, separately withdrawing from said contact zone an aqueous raffinate containing said sulfuric acid and some dissolved solvent and formic acid, distilling said raffinate whereby sulfuric acid is concentrated therein, cycling said sulfuric acid thus concentrated to said reaction chamber, condensing the distillate from the raffinate distilling step to form a two phase liquid comprising water in one phase, and said solvent in another phase, cycling said last mentioned solvent to said contact zone, distilling said extract to separate solvent as a distillate from levulinic acid and said impurities contained therein, cycling said last mentioned distillate to said contact zone, further fractionating the bottoms of said last mentioned distilling step to produce the desired levulinic acid product and a bottoms fraction containing said impurities and some levulinic acid, and recycling said bottoms fraction to an earlier stage in the process.

8. The process recited in claim 7 wherein said bottoms fraction is recycled to said reaction zone.

9. The process recited in claim 7 wherein said extractive solvent is methyl isobutyl ketone.

10. The process recited in claim 7 wherein said solvent is furfural.

11. The process recited in claim 3 wherein said catalyst is phosphoric acid.

12. The process recited in claim 3 wherein said catalyst is sodium acid sulfate.

13. The process recited in claim 3 wherein said solvent is furfural.

References Cited in the file of this patent
UNITED STATES PATENTS

| | | |
|---|---|---|
| 2,206,311 | Thompson | July 2, 1940 |
| 2,257,389 | Maccallum | Sept. 30, 1941 |
| 2,270,328 | Moyer | Jan. 20, 1942 |
| 2,684,981 | Sherman | July 27, 1954 |
| 2,684,982 | Dunlop | July 27, 1954 |